Aug. 29, 1950     C. J. YARRICK ET AL     2,520,792
MULTIRANGE OVERCURRENT RELAY
Filed Nov. 17, 1948     3 Sheets-Sheet 1
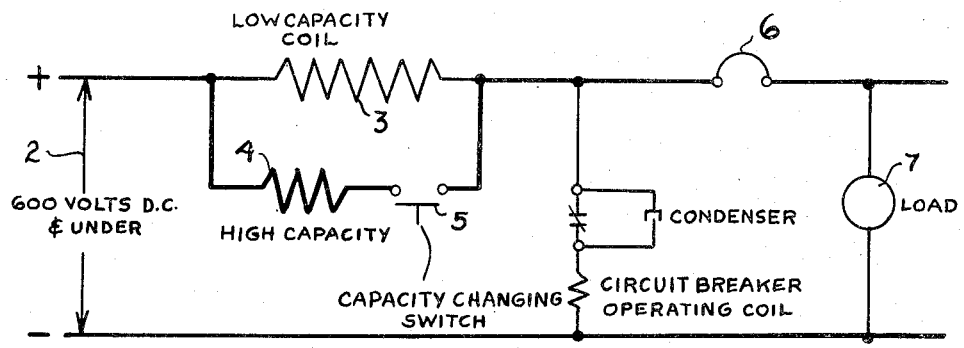
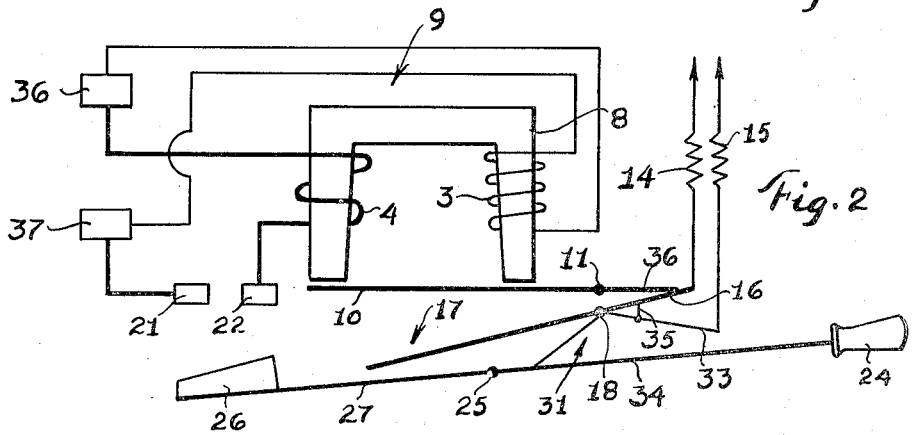
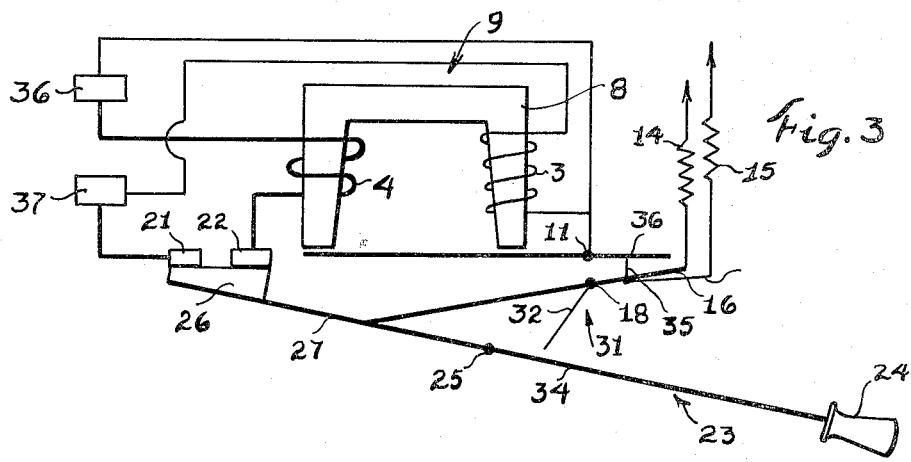
INVENTOR.
Charles J. Yarrick
BY E. Harold Fredrichson
Ostrolenk & Faber
ATTORNEYS.

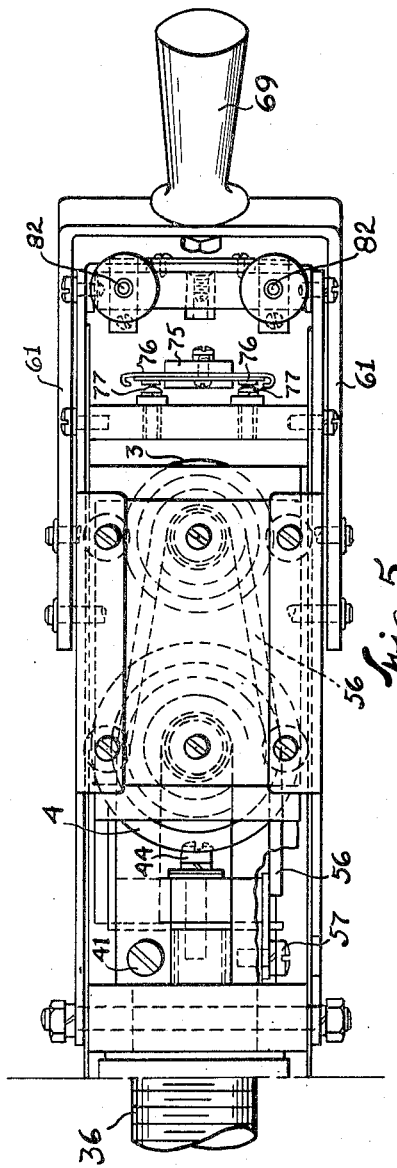
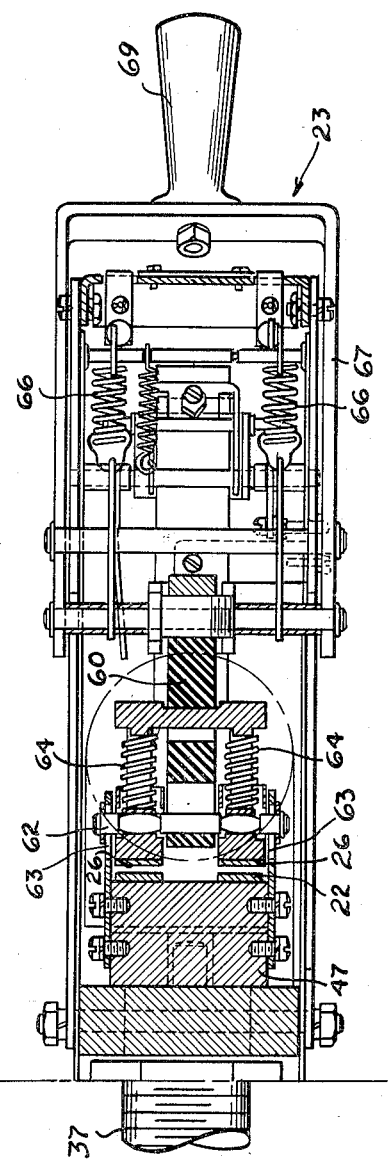

Patented Aug. 29, 1950

2,520,792

UNITED STATES PATENT OFFICE 2,520,792

MULTIRANGE OVERCURRENT RELAY

Charles J. Yarrick, Collingswood, N. J., and Einar Harold Fredrickson, Philadelphia, Pa., assignors to I-T-E Circuit Breaker Company, Philadelphia, Pa., a corporation of Pennsylvania Application November 17, 1948, Serial No. 60,518

12 Claims. (Cl. 175—294)

Our invention relates to circuit breakers, and more specifically to a novel trip mechanism therefor.

In many installations of circuit breakers for protection of a circuit, conditions on the circuit may vary over a wide range. In such a case a circuit breaker having its trip magnet set to operate in response to a predetermined fault current for protecting the system is inadequate to protect the system when the load has in turn been reduced and fault current conditions of a lower than the first mentioned value may require protection.

Thus, for example, in mining installations it may happen that during normal operations the circuit breaker operating capacity may be of the order of 1600 amperes or more during the day. In such a circuit there may also be connected some continuous day and night operating equipment drawing considerably less current, as for example a pump or blower motors with current consumption of the order of 100 amperes.

In such a situation the 1600 ampere circuit breaker, while adequate protection for the electrical equipment during normal daytime operations, is inadequate for protection of such a 100 ampere load during the night hours. While in many instances this problem can be and is solved by placing a circuit breaker of proper capacity in close proximity to the equipment to be protected, there are circumstances in which this is not economical and it is desirable that the same circuit breaker have the dual capacity of serving for both day and night operation.

In essence our invention provides a trip magnet for a circuit breaker having at least two windings, one of which is of few turns for carrying normal large operating currents and a second winding of a large number of turns capable of carrying only smaller currents.

We selectively connect either the first of the above mentioned windings or both the first and the second into the system depending upon the load conditions to be protected. Simultaneously other adjustments are effected so that the trip magnet will respond to a fault current of one value when one of these windings is connected in the system and to a different value when the other winding is connected in the system.

Accordingly an object of our invention is to provide a novel trip magnet responsive to wide ranges of fault currents for protection of a system in which the range of fault currents may correspondingly vary over a wide range.

A further object of our invention is to provide a novel circuit breaker having a low current and a high current trip magnet.

Still another object of our invention is to provide a novel circuit breaker trip magnet having at least two biasing springs selectively rendered operative.

These and other objects of our invention will be more fully described in connection with the drawings in which:

Figure 1 is a circuit diagram showing the method of connecting the windings into the system.

Figure 2 is a schematic diagram showing our novel trip magnet with one of its windings and one of its springs in operative condition.

Figure 3 is a schematic illustration of the trip magnet with the other of its windings and its associated spring in operative condition.

Figure 5 is a top plan view of the trip magnet.

Figure 6 is a bottom plan view of the trip magnet.

Figure 4:
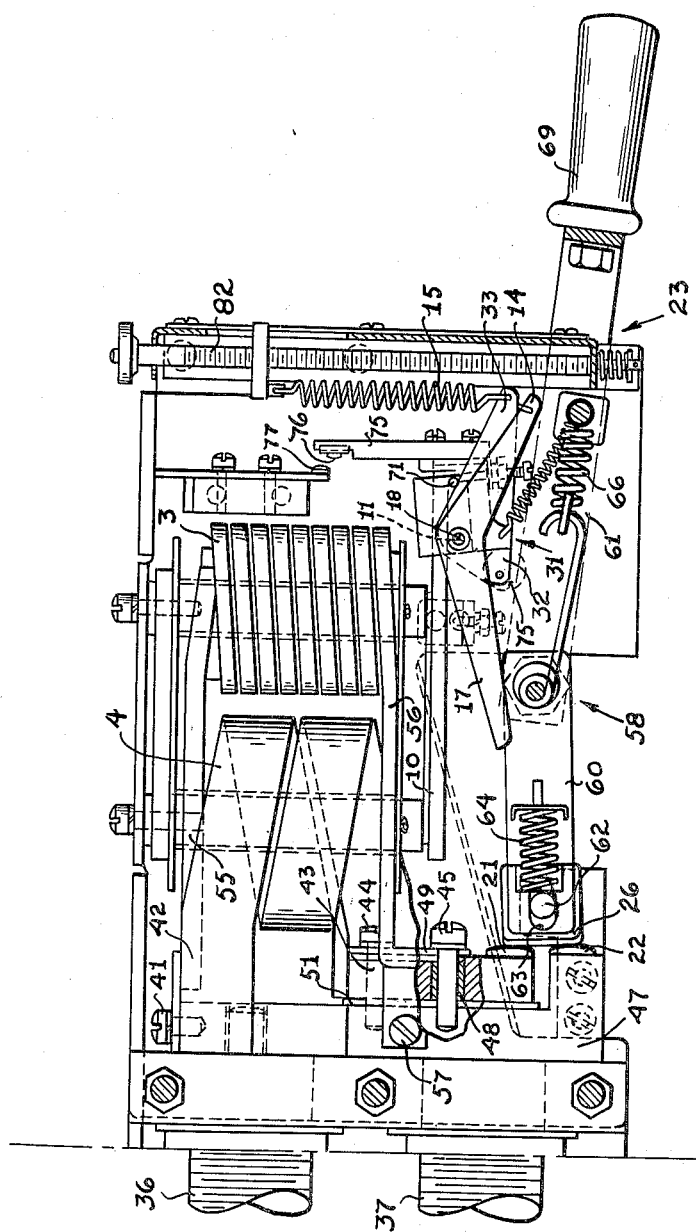
Figure 4 is a side view of a preferred construction of the trip magnet.

Referring now to Figure 1, we have shown here the circuit arrangement of the two overcurrent coils 3 and 4 connected through suitable studs to a source of power supply 2 and intended to control the operation of the circuit breaker 6 which is in the circuit of the load 7.

Trip coil 3 is a low capacity coil of relatively thin wire and relatively many turns and is designed so that when a predetermined relatively low current flows through this winding, the generated ampere turns will induce a corresponding flux sufficient to operate the armature associated with this magnet for tripping the circuit breaker as will be described in more detail hereinafter.

When it is desired that the breaker trip at a higher current than the above predetermined amount, switch 5 is operated to insert the high capacity winding 4 of relatively few turns and relatively large wire into the circuit. These turns are designed so that when a predetermined current of relatively high value flows through these windings, the ampere turns will be such as to generate a flux sufficient to operate the armature of the circuit breaker to trip the circuit breaker 6.

The method for effecting this operation is schematically shown in Figures 2 and 3. Here the winding 3 of many turns is shown on the right leg of the magnetic structure 8 of the trip magnet 9 and the smaller number of turns 4 is shown on the left leg of the magnetic structure 8 of trip magnet 9. Trip magnet 9 has associated with it an armature 10 pivoted at 11. Two biasing springs 14 and 15 are provided for the armature.

In the condition shown in Figure 2, the low capacity winding 3 is in its operative condition and is responsive to current conditions in the electrical circuit being protected by circuit breaker 6. The armature 10 is biased to its open position by the biasing spring 14, associated with winding 3, which is in mechanical connection with the armature 10 at the engaging point 16 through the member 17 which is pivotally mounted at 18. As schematically shown, spring 14 is mechanically connected to member 17 and biases it counterclockwise about pivot 18 until the right end of member 17 engages armature 10 at 16. The tension spring 14 then applies a counterclockwise bias to armature 10 through member 17 to engaging surface 16.

In the condition shown in Figure 2, the high capacity winding 4 of few turns is disconnected from the circuit. The spring 15 associated with winding 4 is at this time in non-operative condition since it is not in mechanical connection with the armature 10 as will be more clear hereinafter.

When now current of a predetermined amperage flows through the winding 3 sufficient to overcome the bias of spring 14, the armature 10 is attracted against the bias of spring 14 and will effect a trip operation in the manner to be described.

If now it is desired to change the trip characteristic of the circuit breaker, i. e., the current response, the operating arm 23 having a handle 24 is operated about its pivot 25 in a clockwise direction rocking the bridging contact member 26 into engagement with the contacts 21 and 22 as shown in Figure 3. As the arm 23 is rocked about its pivot 25, the left end of the arm 23 at 27 engages the lever 17 and rocks it about its pivot at 18 in a clockwise direction until the point 16 thereon is moved out of engagement with the armature 10 as shown in Figure 3.

In this condition the biasing spring 14 has become non-effective to bias the armature 10 since it is no longer in physical engagement with it.

As operating arm 23 is rocked clockwise, the lever 31 also pivoted at 18 and comprising extension 32 and extension 33 is rocked about its pivot 18 in a counterclockwise direction by the biasing spring 15 to which it is connected.

This movement continues until projection 35 secured to extension 33 engages the armature 10 at the point 36. Further movement of arm 23 now effects disengagement thereof from extension 32 at 34.

At this point the spring 15 has been brought into mechanical connection with the armature 10 and biases the armature 10 to disengaged position. At the same time the bridging member 26 engages and bridges the contacts 21 and 22 bringing the high capacity winding 4 into the circuit. Although at this time both windings 3 and 4 are in the circuit, most of the current will flow through the winding 4 of lower resistance. Moreover, calibrations may be made on the basis of the current distribution in both windings.

When now a current of relatively high amperes of an abnormal value for that particular protection flows through the winding 4, the electromagnet 9 will be energized to operate the armature 10 against the bias of the spring 15 and the armature 10 on being pulled toward the pole face will engage the tripping mechanism as will be more fully described hereinafter.

From the above schematic description it will be seen that we have here provided an arrangement in which the trip magnet comprises two windings, a high and a low capacity winding and two associated biasing springs.

An operating arm selectively renders either the high capacity or low capacity winding effective. Simultaneously it mechanically connects the associated biasing spring into operative relation with the armature of the magnet.

In general it will be observed that this is achieved by two pivotal levers 17 and 31 respectively. In one position of the arm 23, as for example that shown in Figure 2, the lever 17 has been freed from the arm 23 due to its counterclockwise rotation about pivot 25 and has been rocked by the biasing spring 14 in a counterclockwise direction until it engages the armature 10 at point 16 and renders biasing spring 14 effective on the armature.

Simultaneously the arm 23 has engaged the lever 32 and rocked it in a clockwise direction until its projection 35 disengaged the armature 10 so that the biasing spring 15 is no longer effective.

In the alternate position shown in Figure 3, the arm 23 has been rocked about its pivot 25 in a clockwise direction until bridging member 26 bridges contacts 21 and 22. In this position the lever 32 has been freed of the arm 34 and under the action of its biasing spring 15 has been rocked in a clockwise direction until its projection 35 engages the armature 10 so that the spring 15 is effective to bias the armature 10.

At the same time the arm 23 has engaged and rocked the lever 17 in a clockwise direction about pivot 18 until it has disengaged the armature 10 at point 16 thus rendering spring 14 ineffective as the biasing spring on the armature 10.

Referring now more specifically to the detailed drawings, Figures 4 to 6, two studs 36 and 37 are provided for current leads from the circuit being protected to the windings of the trip magnet and are suitably insulated from the supporting structure in a manner well known in the art. Connected to the stud 36 as by a screw 41 is the conductor 42 which is connected to the high capacity winding 4 of few turns.

As here shown, the winding 4 is made of few turns of relatively large current carrying capacity and is secured to a terminal block 43 by connection screw 44. Conductor block 43 is held in place by screw 45 extending through an opening 46 in block 43 and into the conductive section 47. Screw 45 is electrically insulated from block 43 by insulation bushing 48 and insulation washer 49. Block 43 is electrically insulated from section 47 by the insulation spacer 51.

Thus the conductor block 43 is insulated from the stud 37 by the insulated spacer 51 and is held on the main frame through insulated screw 45. At one end of the block 43 contact 21 is suitably mounted for bridging engagement with the contact 22 suitably supported on the member 47 which is electrically in connection with the stud 37.

Terminal screw 41 in addition to securing the conductor 42 also secures the conductor lead 55 of low current carrying capacity and connected to the winding 3 of a large number of turns of small current carrying capacity, the opposite end of which extends over the current lead 56 to the terminal block 47 to which it is secured by terminal screw 57. Thus winding 3 is directly connected between studs 36 and 37.

In the position shown in the drawings, contacts 21 and 22 are bridged by the bridging contact member 26. Bridging contact member 26 is mounted on one end of link 60 by means of a pin 62 extending through an elongated slot 63 in link 60. A compression spring 64 held at one end in cup 65 biases the bridging contact member 26 toward the contacts 21, 22.

A toggle mechanism 58 pivoted at 59 comprises in addition to the link 60, a link 61, which is secured to the handle 69 and is held in its overcenter position by spring 66, one end of which is secured to link 60 and the other end held in link 61.

In the position shown, the toggle mechanism 58 is in the position obtained when the handle is in its lower clockwise position corresponding to Figure 3. In this position the member 17 is engaged by link 60 and has been rocked clockwise about pivot 18 until its extension 16 is moved out of engagement with armature 10. Spring 14 is accordingly ineffective at this time and the armature 10 is biased by spring 15.

When the arm 69 is rocked counterclockwise, the toggle 58 will ride over-center to collapse in its lower position at which point the bridging contact 26 disengages contacts 21, 22.

As link 60 moves downward, extension 17 follows due to the biasing action of spring 14 until the extension 16 engages pin 71 to bias the armature 10 counterclockwise about the pivot 11. Further movement of the handle now frees the extension 17 from link 60. In this condition the armature is biased by spring 14.

During the movement of arm 23, link 61 engages roller 75 of extension 32 and rocks it in a clockwise direction until extension 33 of the member 31 is moved out of engagement with armature 10 and accordingly spring 15 is now ineffective.

As will be clear from the drawing, each of the biasing springs 14 and 15 is provided with calibration screws 82 permitting for adjusting the biasing springs for response of the magnet over a predetermined current range in a manner well known in the art.

Secured to the armature at one end thereof is a connecting arm 75 having a contact 76 at its upper end which is operable to engage and disengage the contact 77.

When the electromagnet 9 is energized and the armature is operated about its pivot against the biasing action of its associated spring, the arm 75 is moved to operate its associated contact into closing engagement with the contact 77. Engagement of these contacts completes a circuit for a trip magnet for circuit breaker 6.

Although there is here shown a relay trip mechanism for energization of a tripping magnet, it will be apparent to those skilled in the art that if desired the operation of the armature 10 may be caused to directly operate a tripping mechanism instead of acting as a relay device.

While we have described in the above a detailed illustration of one form of our invention, we do not wish to be limited thereby but only by the appended claims.

We claim:

1. In a circuit breaker, a trip magnet having a first winding of relatively few turns and relatively high current value carrying capacity, a second winding of relatively many turns and relatively low current value carrying capacity, a switch connected in series with said first energizable winding, said second energizable winding being connected across said first winding and series switch, an armature for said magnet having an operated and non-operated position, a first spring having a tension in accordance with the energizing force of said first winding, a first pivoted lever, one end of said lever being connected to said first spring and having a portion thereof connectable to said armature to provide a mechanical connection from said first spring to said armature for biasing said armature to its non-operated position, a second spring having a tension in accordance with the energizing force of said second winding, a second pivoted lever, one end of said second lever being connected to said second spring and having a portion thereof connectable to said armature to provide a mechanical connection from said second spring to said armature for biasing said armature to its non-operated position, a pivoted operating arm, means operated by said arm when said operating arm is moved about its pivot in one direction for closing said switch to render said first winding effective on energization in response to a predetermined current to operate said armature, said means being operable when said operating arm is moved about its pivot in the opposite direction to open said switch and open the circuit of said first winding and render said second winding effective on energization in response to a lower than said predetermined current to operate said armature, said second pivoted lever being engaged by said operating arm simultaneously with said switch closing means for disconnecting said second spring from said armature while said switch closes the circuit of said first winding and for permitting said first spring to be operated into mechanical connection with said armature to bias said armature to its non-operated position, said operating arm when operating said switch closing means to open said switch simultaneously engaging said first pivoted lever to disconnect said first spring from said armature and permit said second spring to be operated into mechanical connection with said armature to bias said armature.

2. In a circuit breaker, a trip magnet having a first winding of relatively few turns and relatively high current value carrying capacity, a second winding of relatively many turns and relatively low current value carrying capacity, a switch connected in series with said first energizable winding, said second energizable winding being connected across said first winding and series switch, an armature for said magnet having an operated and non-operated position, a first spring having a tension in accordance with the energizing force of said first winding, a first pivoted lever, one end of said lever being connected to said first spring and having a portion thereof connectable to said armature to provide a mechanical connection from said first spring to said armature for biasing said armature to its non-operated position, a second spring having a tension in accordance with the energizing force of said second winding, a second pivoted lever, one end of said second lever being connected to said second spring and having a portion thereof connectable to said armature to provide a mechanical connection from said second spring to said armature for biasing said armature to its non-operated position, a pivoted operating arm, means operated by said arm when said operating arm is moved about its pivot in one direction for closing said switch to render said first winding effective on energization in response to a predetermined current to operate said armature, said means being operable when said operating arm is moved about its pivot in the opposite direction to open said switch and open the circuit of said first winding and render said second winding effective on energization in response to a lower than said predetermined current to operate said armature, said second pivoted lever being engaged by said operating arm on one side of the pivot of said operating arm simultaneously with said switch closing means for disconnecting said second spring from said armature while said switch closes the circuit of said first winding and for permitting said first spring to be operated into mechanical connection with said armature to bias said armature to its non-operated position, said operating arm when operating said switch closing means to open said switch simultaneously engaging said first pivoted lever on the opposite from said one side of said pivot of said operating arm to disconnect said first spring from said armature and permit said second spring to be operated into mechanical connection with said armature to bias said armature.

3. In a circuit breaker, a trip magnet having a first winding of relatively few turns and relatively high current value carrying capacity, a second winding of relatively many turns and relatively low current value carrying capacity, a switch for selectively rendering said first and second windings operative to energize said magnet in accordance with individual predetermined currents, an armature for said magnet having an operated and non-operated position, a first spring having a tension in accordance with the energizing force of said first winding, a first pivoted lever, one end of said lever being connected to said first spring and having a portion thereof connectable to said armature to provide a mechanical connection from said first spring to said armature for biasing said armature to its non-operated position, a second spring having a tension in accordance with the energizing force of said second winding, a second pivoted lever, one end of said second lever being connected to said second spring and having a portion thereof connectable to said armature to provide a mechanical connection from said second spring to said armature for biasing said armature to its non-operated position, a pivoted operating arm, means operated by said arm when said operating arm is moved about its pivot in one direction for closing said switch to render said first winding effective on energization in response to a predetermined current to operate said armature, said means being operable when said operating arm is moved about its pivot in the opposite direction to open said switch and open the circuit of said first winding and render said second winding effective on energization in response to a lower than said predetermined current to operate said armature, said second pivoted lever being engaged by said operating arm simultaneously with said switch closing means for disconnecting said second spring from said armature while said switch closes the circuit of said first winding and for permitting said first spring to be operated into mechanical connection with said armature to bias said armature to its non-operated position, said operating arm when operating said switch closing means to open said switch simultaneously engaging said first pivoted lever to disconnect said first spring from said armature and permit said second spring to be operated into mechanical connection with said armature to bias said armature.

4. In a circuit breaker, a trip magnet having a first winding of relatively few turns and relatively high current value carrying capacity, a second winding of relatively many turns and relatively low current value carrying capacity, a switch for selectively rendering said first and second windings operative to energize said magnet in accordance with individual predetermined currents, an armature for said magnet having an operated and non-operated position, a first adjustable spring having a tension in accordance with the energizing force of said first winding, a first lever for connecting said first spring to said armature for biasing said armature to its non-operated position, a second adjustable spring having a tension in accordance with the energizing force of said second energized winding, a second lever for connecting said second spring to said armature for biasing said armature to its non-operated position, an operating arm, means operated by said arm when said operating arm is moved in one direction for closing said switch to render said first winding effective on energization in response to a predetermined current to operate said armature, said means being operable when said operating arm is moved in the opposite direction to open said switch and open the circuit of said first winding and render said second winding effective on energization in response to a lower than said predetermined current to operate said armature, said second lever being engaged by said operating arm simultaneously with said switch closing means for disconnecting said second spring from said armature while said switch closes the circuit of said first winding and for permitting said first spring to be operated into mechanical connection with said armature to bias said armature to its non-operative position, said operating arm when operating said switch closing means to open said switch simultaneously engaging said first lever to disconnect said first spring from said armature and permit said second spring to be operated into mechanical connection with said armature to bias said armature.

5. In a circuit breaker, a trip magnet having a first winding of relatively few turns and relatively high current value carrying capacity, a second winding of relatively many turns and relatively low current value carrying capacity, a switch for selectively rendering said first and second windings operative to energize said magnet in accordance with individual predetermined currents, an armature for said magnet having an operated and non-operated position, a first spring having a tension in accordance with the energizing force of said first winding, a second spring having a tension in accordance with the energizing force of said second energized winding, an operating arm, means operated by said arm when said operating arm is moved about its pivot in one direction for closing said switch to render said first winding effective on energization in response to a predetermined current to operate said armature, said means being operable when said operating arm is moved about its pivot to open said switch and open the circuit of said first winding and render said second winding effective on energization in response to a lower than said predetermined current to operate said armature, means controlled by said operating arm simultaneously with said switch closing means for disconnecting said second spring from said armature while said switch closes the current of said first winding and for connecting said first spring to said armature, said operating arm when operating said switch closing means to open said switch simultaneously disconnecting said first spring from said armature and connecting said second spring to said armature.

6. In a circuit breaker, a trip magnet having a first winding of relatively few turns and relatively high current value carrying capacity, a second winding of relatively many turns and relatively low current value carrying capacity, a switch connected in series with said first energizable winding, said second energizable winding being connected across said first winding and series switch, an armature for said magnet having an operated and non-operated position, a first spring having a tension in accordance with the energizing force of said first winding, a mechanical connection connectible from said first spring to said armature for biasing said armature to its non-operated position, a second spring having a tension in accordance with the energizing force of said second energized winding, a mechanical connection connectible from said second spring to said armature for biasing said armature to its non-operated position, an operating arm, means controlled by said arm for closing said switch to render said first winding effective on energization to operate said armature, means controlled by said operating arm simultaneously with said switch closing means for completing said mechanical connection of said first spring to said armature for biasing said armature while said switch closes the current of said first magnet, said operating arm operating said switch closing means to open said switch and simultaneously disconnecting said mechanical connection of said first spring to said armature and connecting said second spring to said armature.

7. In a circuit breaker, a trip magnet having a first winding of relatively few turns and relatively high current value carrying capacity, a second winding of relatively many turns and relatively low current value carrying capacity, a switch for selectively rendering said first and second winding operative to energize said magnet in accordance with individual predetermined currents, an armature for said magnet having an operated and non-operated position, a first spring having a tension in accordance with the energizing force of said first winding, a mechanical connection connectible from said first spring to said armature for biasing said armature to its non-operated position, a second spring having a tension in accordance with the energizing force of said second energized winding, a mechanical connection connectible from said second spring to said armature for biasing said armature to its non-operated position, an operating arm, means controlled by said arm for closing said switch to render said first winding effective on energization to operate said armature, means controlled by said operating arm simultaneously with said switch closing means for completing said mechanical connection of said first spring to said armature for biasing said armature while said switch closes the current of said first magnet, said operating arm operating said switch closing means to open said switch and to simultaneously disconnect said mechanical connection of said first spring to said armature and connecting said second spring to said armature.

8. An electromagnet having a first winding of relatively few turns and relatively high current value carrying capacity, a second winding of relatively many turns and relatively low current value carrying capacity, a switch connected in series with said first energizable winding, said second energizable winding being connected across said first winding and series switch, an armature for said magnet having an operated and non-operated position, a first adjustable spring having a tension in accordance with the energizing force of said first winding, a mechanical connection connectible from said first spring to said armature for biasing said armature to its non-operated position, a second adjustable spring having a tension in accordance with the energizing force of said second energized winding, a mechanical connection connectible from said second spring to said armature for biasing said armature to its non-operated position, an operating arm, means controlled by said arm for closing said switch to render said first winding effective on energization to operate said armature, means controlled by said operating arm simultaneously with said switch closing means for completing said mechanical connection of said first spring to said armature for biasing said armature while said switch closes the current of said first magnet, said operating arm operating said switch closing means to open said switch and to simultaneously disconnect said mechanical connection of said first spring to said armature and connecting said second spring to said armature.

9. In a circuit breaker, a trip magnet having a first winding, a second winding, a switch connected in series with said first energizable winding, said second energizable winding being connected across said first winding and series switch, and armature for said magnet having an operated and non-operated position, a first spring having a tension in accordance with the energizing force of said first winding, a first pivoted lever, one end of said lever being connected to said first spring and having a portion thereof connectable to said armature to provide a mechanical connection from said first spring to said armature for biasing said armature to its non-operated position, a second spring having a tension in accordance with the energizing force of said second winding, a second pivoted lever, one end of said second lever being connected to said second spring and having a portion thereof connectable to said armature to provide a mechanical connection from said second spring to said armature for biasing said armature to its non-operated position, a second spring having a tension in accordance with the energizing force of said second winding, a second pivoted lever, one end of said second lever being connected to said second spring and having a portion thereof connectable to said armature to provide a mechanical connection from said second spring to said armature for biasing said armature to its non-operated position, a pivoted operating arm, means operated by said arm when said operating arm is moved about its pivot in one direction for closing said switch to render said first winding effective on energization in response to a predetermined current to operate said armature, said means being operable when said operating arm is moved about its pivot in the opposite direction to open said switch and open the circuit of said first winding and render said second winding effective on energization in response to a lower than said predetermined current to operate said armature, said second pivoted lever being engaged by said operating arm simultaneously with said switch closing means for disconnecting said second spring from said armature while said switch closes the circuit of said first winding and for permitting said first spring to be operated into mechanical connection with said armature to bias said armature to its non-operated position, said operating arm when operating said switch closing means to open said switch simultaneously engaging said first pivoted lever to disconnect said first spring from said armature and permit said second spring to be operated into mechanical connection with said armature to bias said armature.

10. In a circuit breaker, a trip magnet having a first winding, a second winding, a switch for selectively rendering said first and second windings operative to energize said magnet in accordance with individual predetermined currents, an armature for said magnet having an operated and non-operated position, a first spring having a tension in accordance with the energizing force of said first winding, a first pivoted lever, one end of said lever being connected to said first spring and having a portion thereof connectable to said armature to provide a mechanical connection from said first spring to said armature for biasing said armature to its non-operated position, a second spring having a tension in accordance with the energizing force of said second winding, a second pivoted lever, one end of said second lever being connected to said second spring and having a portion thereof connectable to said armature to provide a mechanical connection from said second spring to said armature for biasing said armature to its non-operated position, a pivoted operating arm, means operated by said arm when said operating arm is moved about its pivot in one direction for closing said switch to render said first winding effective on energization in response to a predetermined current to operate said armature, said means being operable when said operating arm is moved about its pivot in the opposite direction to open said switch and open the circuit of said first winding and render said second winding effective on energization in response to a lower than said predetermined current to operate said armature, said second pivoted lever being engaged by said operating arm simultaneously with said switch closing means for disconnecting said second spring from said armature while said switch closes the circuit of said first winding and for permitting said first spring to be operated into mechanical connection with said armature to bias said armature to its non-operated position, said operating arm when operating said switch closing means to open said switch simultaneously engaging said first pivoted lever to disconnect said first spring from said armature and permit said second spring to be operated into mechanical connection with said armature to bias said armature.

11. In a circuit breaker, a trip magnet having a first winding, a second winding, a switch for selectively rendering said first and second winding operative to energize said magnet in accordance with individual predetermined currents, an armature for said magnet having an operated and non-operated position, a first spring having a tension in accordance with the energizing force of said first winding, a second spring having a tension in accordance with the energizing force of said second energized winding, an operating arm, means operated by said arm when said operating arm is moved about its pivot in one direction for closing said switch to render said first winding effective on energization in response to a predetermined current to operate said armature, said means being operable when said operating arm is moved about its pivot to open said switch to open the circuit of said first winding and render said second winding effective on energization in response to a lower than said predetermined current to operate said armature, means controlled by said operating arm simultaneously with said switch closing means for disconnecting said second spring from said armature while said switch closes the current of said first winding and for connecting said first spring to said armature, said operating arm when operating said switch closing means to open said switch simultaneously disconnecting said first spring from said armature and connecting said second spring to said armature.

12. In a circuit breaker, a trip magnet having a first winding, a second winding, a switch connected in series with said first energizable winding, said second energizable winding being connected across said first winding and series switch, an armature for said magnet having an operated and non-operated position, a first spring having a tension in accordance with the energizing force of said first winding, a mechanical connection connectable from said first spring to said armature for biasing said armature to its non-operated position, a second spring having a tension in accordance with the energizing force of said second energized winding, a mechanical connection connectable from said second spring to said armature for biasing said armature to its non-operated position, an operating arm, means controlled by said arm for closing said switch to render said first winding effective on energization to operate said armature, means controlled by said operating arm simultaneously with said switch closing means for completing said mechanical connection of said first spring to said armature for biasing said armature while said switch closes the current of said first magnet, said operating arm operating said switch closing means to open said switch and simultaneously disconnecting said mechanical connection of said first spring to said armature and connecting said second spring to said armature.

CHARLES J. YARRICK.
EINAR HAROLD FREDRICKSON.

REFERENCES CITED

The following references are of record in the file of this patent:

UNITED STATES PATENTS

| Number | Name | Date |
| --- | --- | --- |
| 991,849 | Herd | May 9, 1911 |
| 1,648,508 | Schweitzer | Nov. 8, 1927 |